March 2, 1937.  S. W. LIPPITT  2,072,459
AIR BAG
Filed Feb. 19, 1935   2 Sheets-Sheet 1
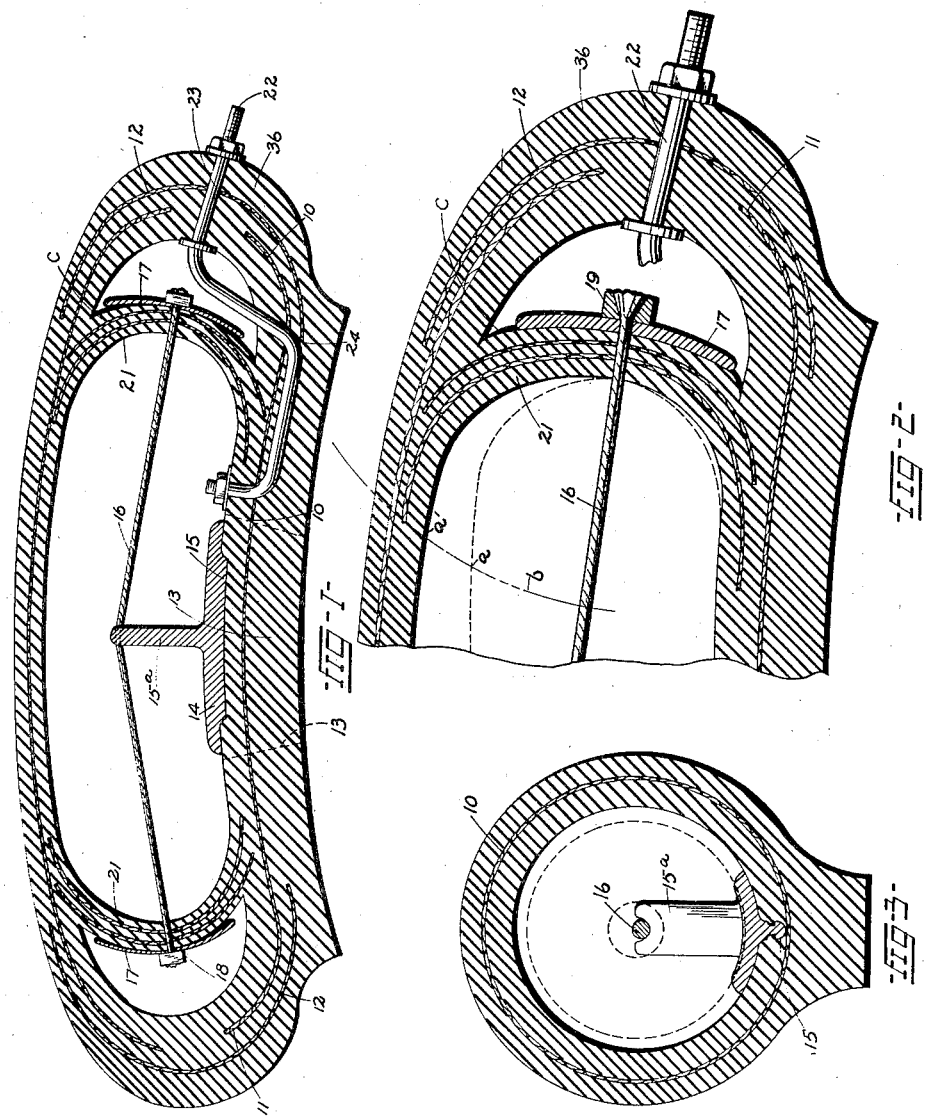
Inventor
STEPHEN W. LIPPITT
By Richey & Watts
Attorney

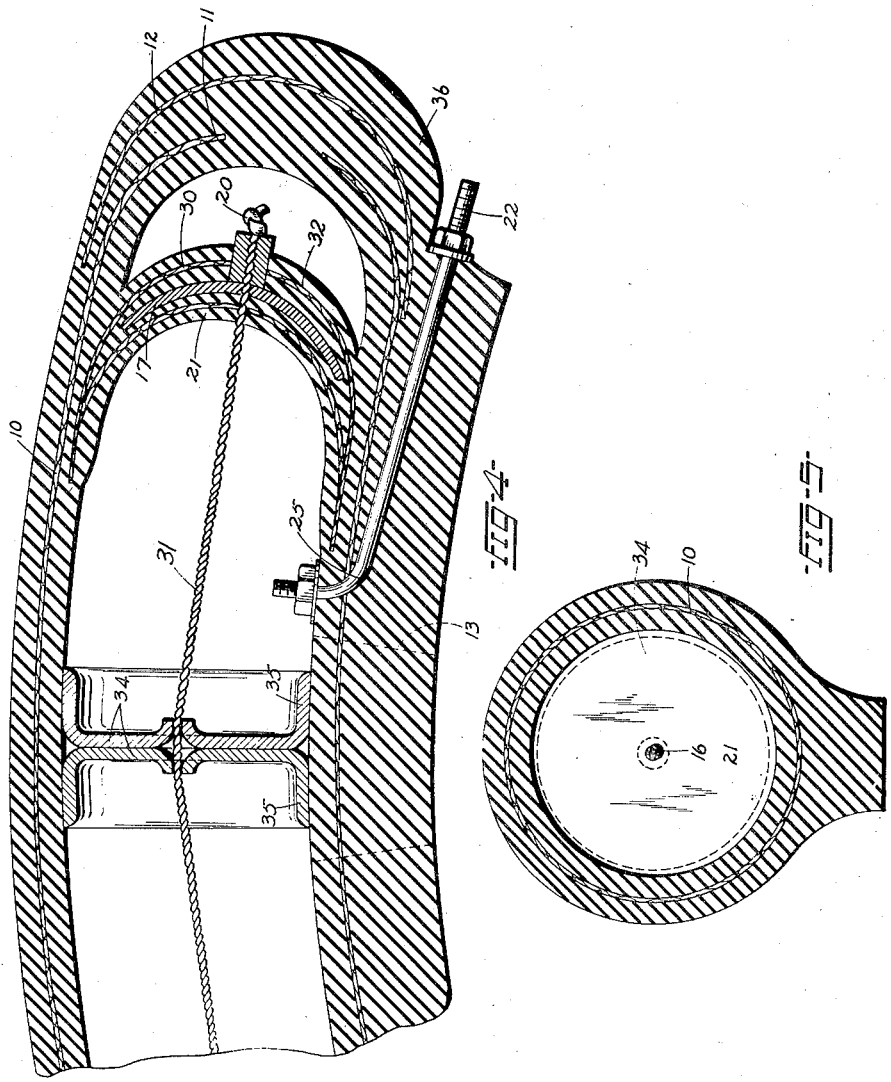

Patented Mar. 2, 1937

2,072,459

UNITED STATES PATENT OFFICE 2,072,459

AIR BAG

Stephen W. Lippitt, Cleveland, Ohio

Application February 19, 1935, Serial No. 7,247

13 Claims. (Cl. 18—45)

This invention relates to improvements in segmental air bags of the type employed in vulcanizing pneumatic tire casings and similar articles.

In the repair of automobile tire casings it is customary to employ an expansible core or air bag within the tire during the vulcanizing operation to support the uncured rubber constituting the patching material between the inner face of the tire and the walls of the mold. Such cores are generally constructed from a rubber coated fabric worked into a closed tubular body constituting a chamber capable of retaining fluid under pressure. When the air bag is in use the side walls thereof are confined between the walls of the vulcanizing mold, the ends of the bag, however, are unsupported and failure of the bag usually occurs at these points. To overcome these localized failures in the end portions of the air bag it is necessary not only to provide mechanism which will sustain the excessive pressure upon the end walls but also to provide a yieldable connection between the elastic side walls of the bag and the portions of the end walls which are rigidly affixed and restrained from deflection.

Such is the construction contemplated by the present invention, the objects thereof including the production of an elastic side wall structure capable of relatively high radial expansion without imposition of excessive stress upon the end portions of the bag; the provision of mechanism to relieve the pressure upon the ends of the bag including a wall construction fashioned to permit compensative movement between the side and end walls of the bag; the provision of a reinforcing fabric which will facilitate maximum elasticity; the provision of a reinforcing fabric capable of being compressed to form a substantial closure for the end portion of the bag thereby avoiding the customary cutting or slitting of the fabric and the overlapped application thereof and in addition to the foregoing objects the provision of a pressure resisting medium which will balance the load imposed upon the end portions of the bag.

Other objects and advantages reside in the specific construction and aggroupment of elements peculiar to the structure embodying the present invention, as will become apparent from a more complete examination of the following specification and appended claims wherein there is assembled and pointed out certain combinations of parts and specific constructions indicative of the scope and spirit of the invention.

In the drawings which illustrate the preferred embodiment of the invention:

Figure 1 is a longitudinal section of an air bag embodying the improved arrangement of the textile reinforcing material and the mechanism for relieving the strains imposed on the end walls of the bag;

Figure 2 is an enlarged portion of the bag illustrated in Figure 1 showing the relative position of the end walls and sides of the bag when inflated;

Figure 3 is a transverse sectional view through the central portion of the air bag illustrated in Figure 1;

Figure 4 is a longitudinal sectional view of a fragmentary portion of an air bag embodying certain modifications of the end wall reinforcing structure;

Figure 5 is a transverse sectional view taken through the central portion of the air bag illustrated in Figure 4.

The air bag embodying the present invention is perfectly constructed from a rubber coated knitted fabric capable of substantial elasticity and also capable of being compressed or squeezed together in a smooth surfaced mass. In the construction of the bag the knitted fabric 10 may first be coated with uncured rubber then worked into tubular form over an arbor or similar body, the end portions of the fabric being compressively worked over a rounded end of the arbor until maximum closure of the end portions 11 is effected. When a knitted fabric of suitable structure is employed a cupped or spheroidal end may be formed without overlapping or wrinkling the fabric. Moreover a substantial end closure may be formed, the central opening remaining after deformation of the fabric being relatively small. Next, a second layer of one or more sheets of rubber coated knitted fabric 12 may be placed over the unclosed end of the bag, the edges thereof being rolled back or cupped in spheroidal form over the end portions of the bag. The ends of the bag may also be formed from an inelastic fabric which is cut, sewed or otherwise formed in configuration of a cup.

In the construction of the air bag the arbor may be extended within the chamber through an opening 13 provided in the base thereof. After the air bag is formed and fully assembled the opening 13 is closed and sealed by vulcanization of the uncured rubber constituting the fabric coating.

Within the air bag there is a plate 14 disposed above the seam of the opening 13 and preferably anchored therein by a rib 15. This construction not only restrains the plate from dislodgment within the bag but effects a reinforcement for the closure of the opening 13. The central portion of the plate 15 is formed with a boss 15a grooved in the upper portion thereof to receive a cord or metallic cable 16. The cable extends axially through the bag to the end portions thereof where it is connected with a pair of discs 17 preferably configured in concavoconvex form. As illustrated, the ends of the cable are provided with lugs or clamps 18 disposed in abutting relation with the outer faces of the discs 17. The discs may be formed of metallic stampings or any other suitable material which is capable of resisting the heat and pressure to which they are subjected. The lugs 18 may be affixed to the cable in any suitable manner as by brazing the splayed ends thereof to the lug or collar 19 as shown in Figure 2 or by forming a knot 20 in the cable as illustrated in Figure 4.

Adjacent each inner face of the disc 17 there is a bulk head or secondary end wall 21. These walls or partitions are formed by placing the edges of one or more circular sheets of tacky rubberized knitted fabric against the inner walls of the bag then working the sheet outwardly upon the circumambient walls of the bag until the central portion of the sheets are cupped with the base portions thereof disposed in abutting relation with the respective discs 17. Obviously, when the uncured rubber in the air bag is vulcanized the end walls 21 will form a homogeneous structure with the bag.

The air bag is provided with a tube 22 to facilitate the inflation of the bag. The tube may be constructed as shown in Figure 1 with a rectilinear portion 23 extending through the axis of the bag and a looped portion 24 curved to afford communication with the chamber and to clear the disc 17 and end wall 21. The tube may if desired be disposed in the ribbed base portion of the air bag, communication with the chamber being effected through an elbow 25 as shown in Figure 4.

In the modified form illustrated in Figure 4 the inner end walls 21 may be constructed with an additional rubber coated sheet of fabric 30 adjacent the outer faces of the respective discs 17. The cable 31 illustrated in this embodiment comprises a fabric cord or rope preferably formed of material incapable of extensibility. The cord 31 may be centrally supported in the air bag by a disc suitably apertured to maintain the cord within the axis of the bag or a pair of discs 34 may be employed which are similarly apertured and formed with opposed peripheral flanges 35 to facilitate their support upon the inner walls of the bag.

In operation when the air bag is inflated the body thereof will be expanded until the side walls impinge the tire casing and are in turn restrained by the walls of the vulcanizing mold. As the side walls are radially expanded the end walls 21 are simultaneously distended until engaged by the discs 17 where further movement will be arrested by the tensioned cable 16 or the cord 31 as embodied in the modification herein shown. It will be apparent that the central portions of the walls 21 will thus be restrained from outward deflection. The outer peripheral portions of the end walls 21 surrounding the periphery of the discs 17 are capable of deflection and will yield with the movement of the side walls of the air bag, moreover the portions of the end walls 21 affixed to the side walls of the bag will move radially outward and will also be extended longitudinally when the bag is inflated. As will be seen by the construction lines in Figure 2 the point a (any assumed point on the inner periphery of the end wall 21) will move in an arc b (an arc struck from the point of affixation of the disc) to the point a' which indicates the direction of translation of the point a when the bag is inflated.

Although the external end portions of the bag are free to move radially and longitudinally with the side walls of the bag, the portions of the end wall 21 (within the zone C or the portions of the end walls intermediate the periphery of the disc and the side walls of the bag) are compressed by the fluid pressure within the chamber during expansion of the bag since the outer ends of the bag are retracted by the radial distension of the bag and since the internal pressure within the bag imposes a thrust upon the area of the end wall within the zone C thus causing the materials therein to be pressed into a compact mass capable of sustaining the stress or internal pressure imposed thereon.

Although the air bag is longitudinally arcuated the stress upon the end walls 21 is equalized since the discs 17 are supported only at their central portions by the cable. This construction also permits the discs to be compensatively adjusted within the bag irrespective of the movement of the bag during the expansion thereof.

It is obvious from the foregoing that since the cable 16 is incapable of any appreciable extensibility the end walls 21 will be relieved of the stress imposed thereon, moreover that the periphery of the bag may be expanded both radially and longitudinally, the outer portions of the walls 21 opening and closing with the side walls thereby relieving the end walls 36 from the deleterious localized stresses to which air bags heretofore constructed with fixed end walls have been subjected.

Although the foregoing description is necessarily of detailed character, in order that the invention may be completely set forth, it is to be understood that the specific terminology is not intended to be restrictive or confining, and that various rearrangements of parts and modifications of structural detail may be resorted to without departing from the scope or spirit of the invention as herein claimed.

I claim:

1. An air bag for receiving fluid under pressure embodying rubber coated fabric side and end walls, secondary end walls within said bag and means to restrain said secondary end walls from longitudinal distention.

2. An expansible air bag for receiving fluid under pressure embodying elastic rubber coated knitted fabric side walls and fabric reinforced end walls, secondary end walls within said bag and means to restrain said secondary end walls from longitudinal distention.

3. An air bag for receiving fluid under pressure embodying rubber fabric side and end walls, secondary end walls within said bag in spaced relation with the first named end wall of said air bag, inflexible discs disposed adjacent the outer faces of said secondary walls, an inextensible member uniting said discs whereby the secondary end walls of the bag will be restrained from longitudinal distention when the air bag is inflated.

4. An expansible air bag for receiving fluid under pressure embodying elastic rubber coated knitted fabric side walls and fabric reinforced end walls, secondary end wall within said bag, said secondary walls comprising rubber coated knitted fabric sheets affixed at their marginal edge to the interior of said air bag and means coordinated with the central portion of said secondary walls to restrain said walls from longitudinal distention during inflation of the bag.

5. An air bag for receiving fluid under pressure embodying rubber coated fabric side and end walls, secondary end walls within said bag, said secondary walls comprising rubber coated knitted fabric secured at its marginal edges to the inner wall of said bag, an inextensible cable axially disposed within said bag and means coordinated with said cable and said secondary end wall to restrain longitudinal distention of the central portion of said walls.

6. An air bag for receiving fluid under pressure comprising elastic rubber coated fabric side and end walls, yieldable partitions within said bag adjacent the end portions thereof, an inextensible member disposed within said bag, inflexible plates connected thereto and disposed to abut the outer faces of said partitions the connection between said inextensible member and said plates comprising a swivel joint to facilitate angular adjustment of the plates when engaged by said partition during inflation of said bag.

7. An air bag for receiving fluid under pressure embodying rubber coated fabric side and end walls, secondary end walls within said bag, an inextensible cable disposed within said bag, discs disposed adjacent the outer faces of said secondary walls and connected at their centers to said cable, a plate within said bag disposed upon the base of the inner wall thereof, a boss on said plate adapted to engage said cable and support the same within the central portion of the bag whereby the discs will be maintained normal to axis of the bag when the bag is inflated and the stress imposed upon the secondary walls is transmitted to said discs.

8. An air bag for receiving fluid under pressure embodying rubber coated fabric side and end walls, secondary end walls within said bag, a flexible inextensible cable disposed within said bag, discs disposed adjacent the outer faces of said secondary walls and connected at their centers to said cable, a plate within said bag disposed upon the base of the inner wall thereof, a boss on said plate adapted to engage said cable and support the same within the central portion of the bag and transmit a compressive force upon the base of said bag when the air bag is inflated and the cable tensioned.

9. An air bag for use in vulcanizing tires embodying rubberized fabric side and end walls, flexible partitions within said bag adjacent the end portions thereof and an inextensible member coordinated with the central portion of said partitions to delimit the distention thereof and facilitate yieldability of the peripheral portions of said partitions.

10. An air bag for receiving fluid under pressure comprising elastic side and end walls, secondary end walls within said bag adjacent the end portions thereof and means coordinated with said secondary end walls to restrain longitudinal distention thereof.

11. An air bag for receiving fluid under pressure comprising a closed end arcuate cylinder embodying rubber coated fabric side and end walls, an inextensible cable within said bag affixed to the central portions of the end walls thereof, an inflexible supporting member within the central portion of said bag resting upon the base thereof, said supporting member engaging and retaining said cable in the transverse center of said bag whereby said cable is held substantially upon the longitudinal axis of the arcuate bag when the air bag is inflated and the cable is under tension.

12. An arcuate cylinder air bag for receiving fluid under pressure embodying rubber coated knitted fabric side walls and reinforced end walls, an inextensible cable within said bag having the ends thereof affixed to the centers of the end walls of the bag, a plate within said bag intermediate the ends thereof resting upon the base of the lower inner wall of the bag, a stanchion on said plate having a groove therein for supporting said cable in the center of the bag whereby said cable is sustained substantially upon the longitudinal axis of the bag and said plate is compressively engaged with the base of the arcuate bag when the air bag is inflated.

13. An arcuate cylinder air bag for receiving fluid under pressure embodying rubber coated fabric side and end walls, an inextensible cable within said bag uniting the end walls thereof, a supporting member within the center of said bag bearing upon the inner lower wall thereof, said cable being engaged by said supporting member and retained thereby in the center of the bag whereby said cable restrains endwise distention of said bag and effects compressive engagement of said supporting member with the inner lower wall of the bag when the arcuate air bag is inflated.

STEPHEN W. LIPPITT.